United States Patent [19]

Bowman

[11] 4,126,478

[45] Nov. 21, 1978

[54] PRODUCTION OF PERICLASE GRAIN

[75] Inventor: Jan Bowman, Orinda, Calif.

[73] Assignee: Kaiser Aluminum & Chemical Corporation, Oakland, Calif.

[21] Appl. No.: 842,820

[22] Filed: Oct. 17, 1977

[51] Int. Cl.$^2$ ............................................. C04B 35/04
[52] U.S. Cl. ........................................ 106/58; 106/59
[58] Field of Search ................................... 106/58, 59

[56] References Cited

U.S. PATENT DOCUMENTS 3,378,383  4/1968  Van Dreser ........................... 106/58

FOREIGN PATENT DOCUMENTS 1,465,880  3/1977  United Kingdom ..................... 106/58

Primary Examiner—James Poer
Attorney, Agent, or Firm—Paul E. Calrow; Malcolm McQuarrie

[57] ABSTRACT

A high purity periclase grain having less than 8 volume % porosity, less than 2% $SiO_2$, and a $CaO:SiO_2$ weight ratio not over 1.0 is produced in a single fire process by mixing from 0.5 to 1.5% finely divided $SiO_2$ with a magnesium hydroxide containing (on the ignited basis) at least 98% MgO, not over 1.5% CaO, and not over 1.0% $SiO_2$, drying the admixture, compacting it at a pressure of at least 10 tons/in$^2$ (1400 kg/cm$^2$), and firing the compacts at a temperature of at least 1700° C.

9 Claims, No Drawings

PRODUCTION OF PERICLASE GRAIN

BACKGROUND OF THE INVENTION

This invention concerns periclase refractory grain, particularly high purity synthetic periclase.

It has been known for many years to produce periclase refractory grain by firing at high temperatures magnesia-yielding materials such as naturally occurring magnesium carbonates ("magnesite") or synthetic material such as magnesium hydroxide produced by reacting sea water or other brine with a calcium source such as calcined dolomite.

In past years, when such starting materials were of relatively low purity, e.g., about 90% MgO, and refractory periclase grain with from 10 to 15% porosity was acceptable, it was customary to take, for example, damp magnesium hydroxide filter cake formed from magnesium hydroxide sludge and put it directly into a rotary kiln where it was fired to temperatures of, for example, 1600° C. It is also known to produce periclase grain of somewhat higher purity, e.g., from 90 to 95% MgO, by adding a sintering aid such as silica to the hydroxide filter cake prior to firing.

However, when it was desired to produce a periclase grain of higher purity, over 95% MgO, and particularly when it was demanded that the porosity of the resulting grain be less than 10%, it was found that the so-called "single burn" process was inadequate, and resort was had to the so-called "double burn" process wherein magnesium hydroxide was first calcined, for example at a temperature of about 1000° C., to form lightburned MgO, which was then compacted and the compacts fired, for example in a shaft kiln, to a temperature of 1800° C. or even higher.

Since the double burn process obviously requires more steps, and is more expensive from both the equipment and operating point of view, the industry has been looking for a method of making high purity periclase of low porosity by a single burn process. U.S. Pat. No. 2,537,014 discloses a method of making periclase grain wherein silica is added to magnesium hydroxide and the admixture fired to form a periclase having from 2 to 6% silica. Similarly, British Pat. No. 1,465,880 discloses a method of producing periclase grain by adding silica to a magnesium hydroxide slurry which is then dried, compacted, and fired to produce a periclase having about 92% MgO, about 4.5% $SiO_2$, and a porosity of over volume 8%. It is also known, as in U.S. Pat. No. 2,487,290, to add a chromium compound (to yield $Cr_2O_3$ upon firing) to magnesium hydroxide sludge, which is then dried, briquetted, and fired.

It has also been found that a dense, high purity periclase can be formed when the lime and silica contents of the periclase are so adjusted that there are at least about 2 parts CaO for each part $SiO_2$ in the grain; i.e., when the predominant secondary phase in the grain is dicalcium silicate. Thus British Pat. No. 1,413,871 discloses a method of making periclase grain wherein magnesium hydroxide filter cake is dried to contain less than 10% water, sufficient finely pulverized silica gel is added and mixed therewith so that the molar ratio of calcia to silica in the sintered products is about 2, the dried admixture is then pressed, and the compacts fired at 1800° C. for 1 hour.

However, for many applications it is desirable that the predominant secondary phase in the periclase grain not be dicalcium silicate, but rather forsterite (2 MgO.-$SiO_2$), with more or less monticellite ($CaO.MgO.SiO_2$). Thus, the art is looking for a method of making a periclase grain of low porosity with over 95% MgO, less than 2% $SiO_2$, and a lime:silica ratio of less than 1.0, by a single burn process. It is to the solution of this problem that the present invention is directed.

SUMMARY OF THE INVENTION

It has now been found, according to this invention, that a dense periclase grain having less than 8 volume % porosity, over 95% MgO, less than 2% total $SiO_2$, and a $CaO:SiO_2$ ratio not over 1.0, whereby the predominant secondary phases are forsterite and monticellite, can be made by (a) selecting a magnesium hydroxide containing, on the ignited basis, not over 1.5% CaO, not over 1.0% $SiO_2$, and at least 98% MgO, the balance being normal impurities; (b) adding sufficient silica less than 44 microns in size to produce a $CaO:SiO_2$ weight ratio not over 1.0, and from 0 to 1% $Cr_2O_3$, based on the total ignited weight of the magnesium hydroxide and silica and $Cr_2O_3$ additives; (c) drying said admixture to a water content of less than 8%, the dried hydroxide containing not over 3% free MgO, both percentages being based on the dry weight of the magnesium hydroxide; (d) compacting the dried admixture at a pressure of at least 10 tons per square inch (1400 kg/cm$^2$) to produce a compact having a bulk density of at least 1.5 g/cc; and (e) firing the compacts to a temperature of at least 1700° C.

DETAILED DESCRIPTION

The magnesium hydroxide used in this invention may be any such material of the requisite purity. While a naturally occurring mineral (brucite) could be used, more commonly a synthetic material, for example one produced from sea water or other brine by reacting the magnesium chloride content thereof with calcined dolomite or limestone or other source of lime, will be more generally available. The hydroxide will be in finely divided form. If a natural mineral is used, this will require grinding, but in the case of a synthetic hydroxide, the material as normally produced is quite fine. As is well known, magnesium hydroxide produced by reacting sea water with calcined dolomite is in the form of extremely small crystallites which agglomerate into larger flocs; accordingly, it is difficult to measure the precise "particle size" of the material. However, the material is such that it will readily pass a 325 mesh screen (i.e., the flocs are smaller than 44 microns).

The added silica can be any such material, but will preferably contain at least 90% $SiO_2$. It can be in a crystalline form (e.g., fine silica sand) or in amorphous form (e.g., volatilized silica). In any case the material will be very finely divided, i.e., substantially all passing a 325 mesh screen (all smaller than 44 microns). Enough $SiO_2$ will be added to reduce the $CaO:SiO_2$ weight ratio to not over 1.0, preferably to less than 0.8, and most preferably to about 0.5.

While the silica addition is essential to the practice of the present invention, other additives, as is well known in the art, can be used. For example, a finely divided source of chromium, for example $Cr_2O_3$ or chrome ore, may be added. It will be noted that when chromium is added it is that material, expressed as $Cr_2O_3$, that is essential and specified as the amount added.

While the silica can be added to the dried hydroxide, it has been found that much better dispersion of the silica in the hydroxide is obtained if it is added to a wet slurry or sludge of hydroxide. In any case, the essential thing is that the silica be well dispersed.

The hydroxide can be dried in any suitable apparatus, for example a rotary dryer or a multiple hearth furnace operated at drying temperatures. The drying of the hydroxide must be controlled very carefully. On the one hand, the hydroxide must have less than 8 weight percent water in order for it to be adequately compacted, and on the other hand must not be over dried to the extent that some of the hydroxide is decomposed to free MgO. In other words, the dried hydrate must contain less than 3% free MgO, since larger amounts than this inhibit sintering in the firing operation, leading to a high porosity product.

The dried hydrate, with added silica, is compacted at a pressure of at least 10 tons/in$^2$ (1400 kg/cm$^2$), the maximum pressure usable being set by equipment limitations. Generally, a pressure of about 30 tons/in$^2$ (4200 kg/cm$^2$) will be used. The compaction can be done in any suitable apparatus, but for volume production roll compaction is preferred. As is well understood in the industry, the determination of the exact pressure applied in a roll press is difficult because of the nature of the apparatus, and pressures in roll presses are generally considered to be equivalent pressures. In any case, the compaction pressure is not critical and any pressure may be used so long as the compacts have a bulk density of at least 1.5 g/cc. While the above minimum pressures and formed densities are highly desirable, some of the benefits of the present invention can be obtained by filtering the magnesium hydroxide and silica admixture in slurry form at relatively high pressures (e.g., 1500 psi, roughly 100 kg/cm$^2$) to form a relatively dense filter cake (e.g., 1.25 g/cc), which can be fired directly in a rotary kiln.

The compacts are fired at a temperature of at least 1700° C. to form a dense periclase grain having less than 8 volume percent porosity. Preferably the firing is carried out at at least 1800° C. Firing may be carried out in a static type of furnace, but again for volume production a rotary kiln is preferred. When firing the compacts in a rotary kiln, they are preferably held for at least about 20 minutes at a temperature above 1800° C.

The resulting product is a periclase grain having over 95%, preferably from 95 to 97%, MgO, less than 2% SiO$_2$, and a CaO:SiO$_2$ ratio less than 1.0, preferably about 0.5. A relatively low lime/silica ratio results in a grain with forsterite (2MgO.SiO$_2$) as the predominant secondary phase, with monticellite (CaO.MgO.SiO$_2$) becoming significant at the higher lime/silica ratios. The grain has less than 8 volume percent, and in the preferred practice less than 5 volume percent, porosity.

EXAMPLE

Magnesium hydroxide was produced from sea water by reacting the magnesium chloride therein with calcined dolomite, following conventional practices. The magnesium hydroxide produced had the following typical chemical analysis (ignited basis): 0.9% CaO, 0.7% SiO$_2$, 0.2% Fe$_2$O$_3$, 0.1% Al$_2$O$_3$, 0.3% B$_2$O$_3$ and (by difference) 97.8% MgO. The hydroxide showed a 31.7% loss on ignition. The hydroxide so produced was filtered on a rotary drum filter to produce a filter cake containing 51.2% solids.

The filer cake was placed in a screw conveyor and there was added to it in the conveyor sufficient silica in the form of diatomaceous earth (Celite brand, sold by Johns-Manville Co.), with an average particle size of less than 10 microns, to produce a total of 1.7% SiO$_2$ (ignited basis). At the same time, there was also added sufficient finely divided low silica Masinloc chrome ore concentrates (over 90% of which passed a 325 mesh screen) to give a Cr$_2$O$_3$ content, on the ignited basis, of 0.3%.

After these additives had been thoroughly mixed into the magnesium hydroxide in the screw conveyor, the material was fed to a multiple hearth furnace operated as a dryer, with a maximum temperature of about 450° C. The hydroxide admixture was dried to an average free water content of about 2.3% and the loss on ignition was maintained at over 30.0%, so that the admixture contained less than 2.5% free MgO due to decomposition of the hydrate. Actually, the dried admixture had substantially no free MgO.

The dried hydrate was fed to a Komerak-Greaves roll press 60 cm wide, where it was formed into pellets 3 cm long × 2 cm wide and about 2 cm thick. The briquettes thus formed had a density of 1.61 g/cm$^3$.

The magnesium hydroxide compacts were fed to a rotary kiln 1.7 m in diameter × 27.5 m long, where they were heated to an average peak temperature of 1830° C. The kiln was operated so that the compacts, on the average, were exposed to a temperature of over 1830° C. for about 20 minutes.

The grain produced during a 60-day trial of this process had an average porosity of 5.4 volume percent (bulk specific gravity 3.35). The fired grain showed the following typical chemical analysis: 0.9% CaO, 1.7% SiO$_2$, 0.4% Fe$_2$O$_3$, 0.3% Al$_2$O$_3$, 0.3% Cr$_2$O$_3$, 0.1% B$_2$O$_3$, and (by difference) 96.3% MgO. Petrographically, the grain had a homogeneous microstructure with uniformly distributed porosity and silicates and an average crystallite size of about 50 microns. The grain was free of relatively coarse voids or cracks normally found in a single fire periclase grain of this general type.

In summary, the present method enables the production, by a single fire process, of a "forsterite bonded" periclase grain (i.e., ore having a low CaO:SiO$_2$ ratio) which has a volume porosity of under 8%, a much lower porosity than that obtainable by prior art processes.

Porosities reported herein were determined by subtracting the bulk specific gravity of the specimen, determined by dividing the weight of the specimen by its volume determined after filling any open pores with water, from the true specific gravity, determined by ASTM method C-604, and dividing the difference by the true specific gravity.

In the specification and claims, percentages and parts are by weight unless otherwise indicated, except that porosities are expressed in volume percent. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 325 mesh corresponds to 44 microns. Analyses of mineral components are reported in the usual manner, expressed as simple oxides, e.g. CaO and SiO$_2$, although the components may actually be present in various combinations, e.g. as a calcium silicate. The term "free MgO" indicates MgO uncombined with other materials, while the term "MgO" refers to material which can be present in combination, as in magnesium hydroxide or a magnesium silicate.

What is claimed is:

1. Method of making a dense periclase refractory grain having less than 8 volume percent porosity, over 95% MgO, less than 2% total $SiO_2$, and a $CaO:SiO_2$ ratio not over about 0.8, whereby the predominant secondary phases are forsterite and monticellite, said method comprising: (a) selecting a magnesium hydroxide containing, on the ignited basis, not over 1.5% CaO, not over 1.0% $SiO_2$, and at least 98% MgO, the balance being normal impurities; (b) adding sufficient silica less than 44 microns in size to produce a $CaO:SiO_2$ weight ratio not over 1.0, and from 0 to 1% $Cr_2O_3$, based on the total ignited weight of the magnesium hydroxide and silica and $Cr_2O_3$ additives; (c) drying said admixture to a water content of less than 8%, the dried hydroxide containing not over 3% free MgO, both percentages being based on the dry weight of the magnesium hydroxide; (d) compacting the dried admixture at a pressure of at least 10 tons per square inch to produce a compact having a bulk density of at least 1.5 g/cc; and (e) firing the compacts to a temperature of at least 1700° C.

2. Method according to claim 1 wherein the magnesium hydroxide has been produced from sea water.

3. Method according to claim 1 wherein the lime:silica ratio in the periclase grain is about 0.5.

4. Method according to claim 1 wherein the porosity of the grain is about 5 volume percent or less.

5. Method according to claim 1 wherein the periclase grain contains from 95 to 97% MgO.

6. Method according to claim 5 wherein the periclase grain has a lime:silica ratio of about 0.5.

7. Method according to claim 5 wherein the periclase grain contains about 96% MgO.

8. Method according to claim 7 wherein the periclase grain has a lime:silica ratio of about 0.5.

9. Method according to claim 8 wherein the porosity of the grain is about 5 volume percent or less.